United States Patent [19]

Okunishi et al.

[11] Patent Number: 4,751,579
[45] Date of Patent: Jun. 14, 1988

[54] SPECIAL IMAGE EFFECT PRODUCING APPARATUS WITH MEMORY SELECTION

[75] Inventors: Munetomi Okunishi, Yokohama; Bunkichi Yamada, Kawasaki; Hiromi Hakoyama, Yokohama, all of Japan

[73] Assignee: Kabushiki Kaisha Toshiba, Kawasaki, Japan

[21] Appl. No.: 31,128

[22] Filed: Mar. 30, 1987

[30] Foreign Application Priority Data

Mar. 31, 1986 [JP] Japan .................................. 61-72813

[51] Int. Cl.⁴ ............................................ H04N 5/272
[52] U.S. Cl. ..................................... 358/183; 358/181
[58] Field of Search ................. 358/183, 22, 180, 181, 358/182, 185, 139; 340/805, 712, 723

[56] References Cited

U.S. PATENT DOCUMENTS

| | | | |
|---|---|---|---|
| 3,609,665 | 9/1971 | Kronies | 340/173 MP |
| 3,644,891 | 2/1972 | McCrea | 340/825.53 |
| 3,858,187 | 12/1974 | Lighthall et al. | 340/173 MP |
| 3,944,731 | 3/1976 | Busch | 358/183 |
| 4,086,619 | 4/1978 | Miyake et al. | 358/183 |
| 4,101,930 | 7/1978 | Sanders et al. | 358/183 |
| 4,293,855 | 10/1981 | Perkins | 340/712 |
| 4,356,475 | 10/1982 | Neumann et al. | 358/139 X |
| 4,477,830 | 10/1984 | Lindman et al. | 358/183 X |
| 4,644,352 | 2/1987 | Fujii | 340/712 X |
| 4,670,782 | 6/1987 | Harshbarger et al. | 358/139 |
| 4,689,683 | 8/1987 | Efron | 358/181 X |

FOREIGN PATENT DOCUMENTS 2126992  6/1971  Fed. Rep. of Germany ...... 340/173 MP

OTHER PUBLICATIONS

The INTEL Memory Design Handbook, Aug. 1973, pp. 6-30 to 6-31 and 6-36 to 6-37.

Primary Examiner—James J. Groody
Assistant Examiner—E. Anne Favis
Attorney, Agent, or Firm—Oblon, Fisher, Spivak, McClelland & Maier

[57] ABSTRACT

An input device inputs waveform number data containing number assigned to a special-effect waveform to be selectively generated. A memory unit is connected to the input device in order to store the waveform number data as input by the input device into the memory unit. A memory selector supplies memory select data to the memory unit for reading out the waveform number data from the memory unit. A waveform code converter converts the waveform number data, as read out from the memory unit, into waveform codes, which correspond to the special-effect waveform to be selectively generated. A special-effect waveform generator generates a special-effect waveform signal in response to the waveform code applied from the waveform code converter. The generated special-effect waveform signal corresponds to the waveform code applied.

12 Claims, 5 Drawing Sheets

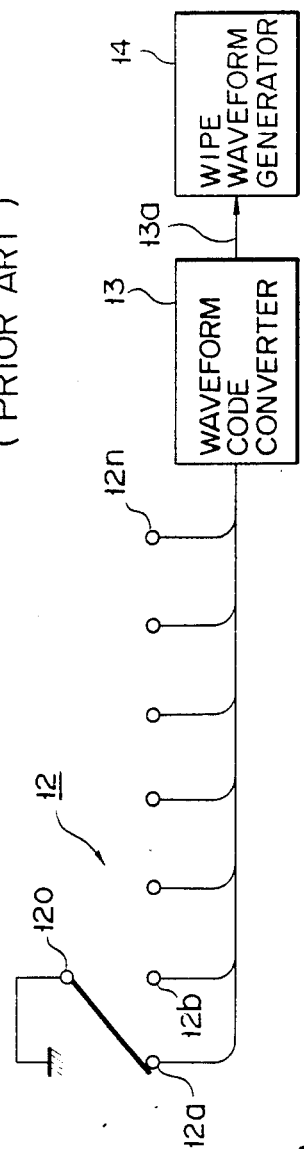
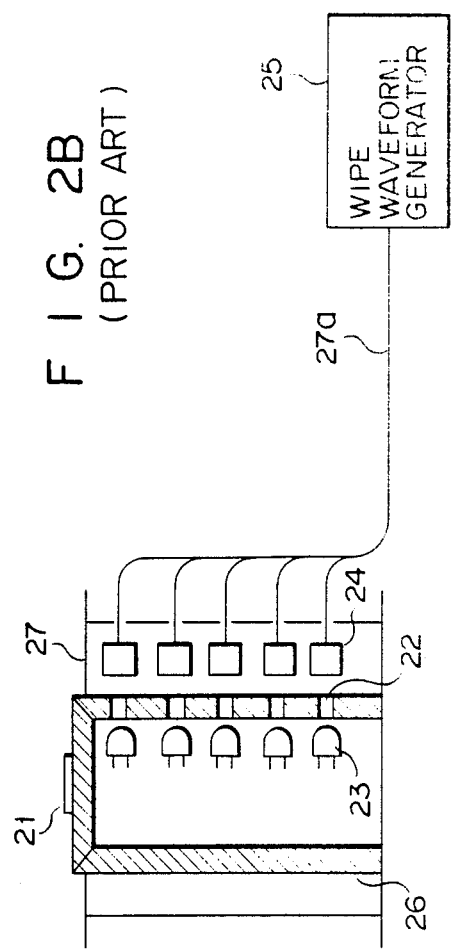
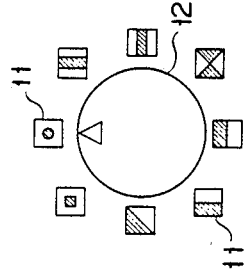
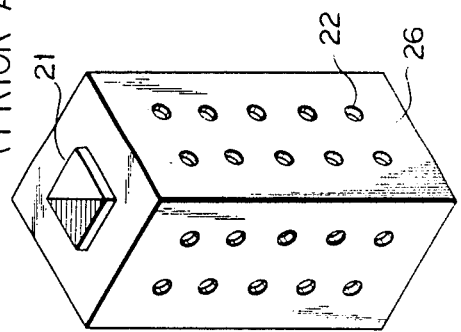
FIG. 1A (PRIOR ART)
FIG. 1B (PRIOR ART)
FIG. 2A (PRIOR ART)
FIG. 2B (PRIOR ART)

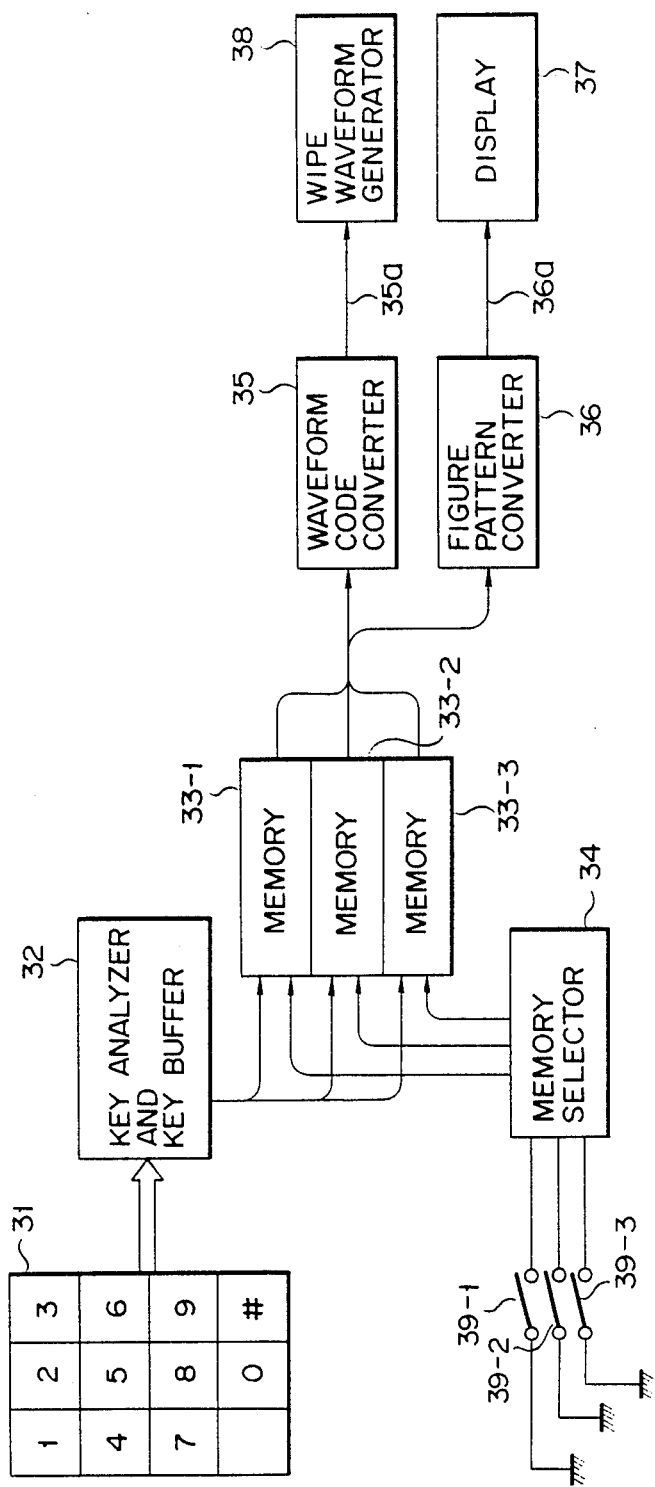

F I G. 6A  F I G. 6B  F I G. 6C
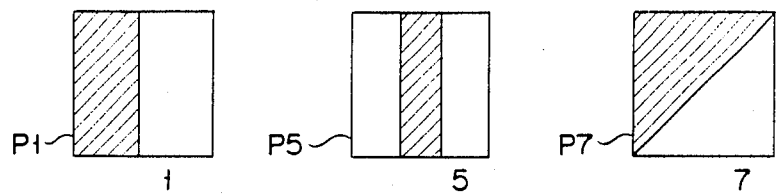
F I G. 7
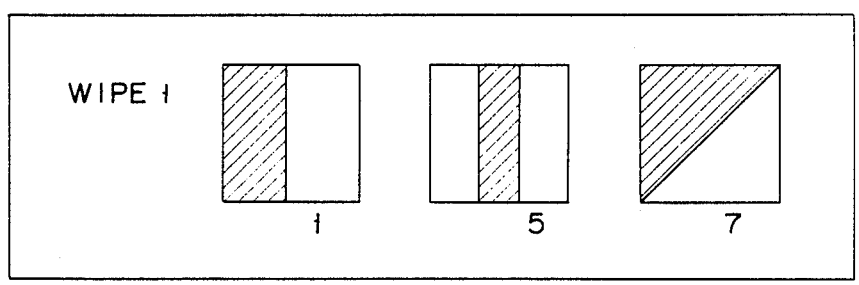

SPECIAL IMAGE EFFECT PRODUCING APPARATUS WITH MEMORY SELECTION

BACKGROUND OF THE INVENTION

This invention relates to a special image effect producing apparatus with a memory selection, and more particularly, to an apparatus for selectively producing special effect waveforms, for example called "wipe", for switching a TV picture with special image effects.

As is well known, in producing television programs, it is frequently performed to switch the TV picture with special effects. A "wipe" is the technique of wiping out a part of the present picture on the TV screen and inserting another picture into the wiped-out portion. Many waveforms are generated and one of them is selected for wipe waveform generation.

The conventional technique for selectively generating the wipe waveform is generally classified into two types. One of them is to use a rotary switch, as shown in FIGS. 1A and 1B. The other is to use a cartridge, as shown in FIGS. 2A and 2B.

The rotary switch technique will be described first.

The front view of a waveform pattern select switch 12, which is provided on the front panel of the related apparatus, is shown in FIG. 1A. A plurality of waveform patterns 11, which correspond to various types of wipe waveforms, are arranged around pattern select switch 12. During operation, an operator sets the pointer of pattern select switch 12 to a desired wipe waveform of those patterns 11.

FIG. 1B shows an electrical scheme of waveform pattern select switch 12 containing its signal processing system. In the figure, select switch 12 contains fixed terminals 12a to 12n. Waveform patterns 11 are provided in association with those fixed terminals. Movable terminal 12o of select switch 12 is moved to be in contact with one of the fixed terminals 12a to 12n, for a desired waveform selection. Fixed terminals 12a to 12n are connected to waveform code converter 13.

The output signal from code converter 13 is transferred in the form of waveform code 13a to wipe waveform generator 14. Responsive to the output signal, generator 14 generates a corresponding wipe waveform. For a desired wipe waveform, the operator turns movable terminal 12o to connect it to the fixed terminal associated with a desired waveform indication. The signal from the selected fixed terminal drives waveform code converter 13. Converter 13 produces a waveform code representative of the desired waveform pattern, and applies it to wipe waveform generator 14.

The cartridge technique for wipe waveform generation will be described referring to FIGS. 2A and 2B. As shown, cartridge 26 is provided with waveform pattern 21 on the top, and holes 22 on one of the sides of the cartridge. The holes 22 are arrayed so as to represent a waveform code of waveform pattern 21.

Light-emitting diodes (LEDs) 23 are paired with photo diodes 24. Each of these pairs is installed on both sides of each hole 22, as shown. Photo diodes 24 are contained in waveform code converter 27. The number of cartridges 26 used is equal to that of the possible wipe waveforms.

In use, cartridge 26 with a desired wipe waveform is coupled with waveform code converter 27. LEDs 23 are energized to emit light. Phototransistor 24 receives the light and is turned on. Transistors 24, located corresponding to non-hole portions of cartridge 26, are left turned off. An on/off pattern of those phototransistors 24 is transferred in the form of waveform code 27a to wipe waveform generator 25. Then generator 25 generates a wipe waveform, which corresponds to waveform code 27a.

The rotary switch technique of FIGS. 1A and 1B has a disadvantage in that the number of selectable waveforms is limited to the number of fixed terminals of rotary switch 12.

The cartridge technique of FIGS. 2A and 2B is advantageous in that the waveform pattern marked on the top of the cartridge is easy for the operator to see. This technique, however, requires many cartridges, that is, the number of cartridges is equal to that of the necessary waveforms. This fact leads to various inconvenient problems. For example, ample space is needed for cartridge storage, and loss of cartridges may often occur.

SUMMARY OF THE INVENTION

It is, therefore, an object of this invention to provide a new and improved special image effect producing apparatus with a memory selection having a greater choice of waveform selections, an improved space factor, and one which is free from loss of cartridges.

Another object of this invention is to provide a selective wipe waveform generator which can automatically generate waveform codes corresponding to waveform numbers and can automatically display the shapes of the waveforms.

According to this invention, there is provided a special image effect producing apparatus comprising:

input means for inputting waveform number data containing a number assigned to a special-effect waveform to be selectively generated;

memory means connected to the input means in order to store the waveform number data, as input by the input means, into the memory means;

memory select means for supplying memory select data to the memory means for reading out the waveform number data from the memory means;

waveform code converting means for converting the waveform number data, as read out from the memory means, into waveform code, which corresponds to the special-effect waveform to be selectively generated; and special-effect waveform generating means for generating a special-effect waveform signal in response to the waveform code applied from the waveform code converting means, the generated special-effect waveform signal corresponding to the waveform code applied.

Such an arrangement of this invention attains many advantageous effects. The prior rotary switch technique for wipe waveform generation is limited in the number of selections of wipe waveforms, because of its limited number of fixed terminals of the switch. This problem can be completely solved by this invention. The prior cartridge technique needs ample space for cartridge storage and suffers from the possibility of loss of cartridges. This problem is also solved by this invention.

BRIEF DESCRIPTION OF THE DRAWINGS

These and other objects and features of this invention can be understood through the following embodiments by reference to the accompanying drawings, in which:

FIGS. 1A and 1B show a front view and a circuit diagram for explaining a prior selective wipe waveform generator using a rotary switch;

FIGS. 2A and 2B show a perspective view and a circuit diagram of a prior selective wipe waveform apparatus using cartridges;

FIG. 3 shows a circuit configuration of an embodiment of a special-effect waveform generating apparatus according to this invention;

FIGS. 6A through 6C show display patterns useful in explaining the waveform selection used in this embodiment;

FIG. 7 shows some examples of modifications of the display patterns; and

DETAILED DESCRIPTION OF THE PREFERRED EMBODIMENTS

Basic ideas of this invention will be given first.

A special waveform generating apparatus of this invention involves a memory for storing a plurality of waveform numbers to be entered, a select means for selecting a given waveform number from those stored in the memory, a converting means for converting the waveform numbers stored in the memory, into the corresponding codes, and a generating means for generating special effect waveforms corresponding to the waveform codes.

A desired waveform number is selectively read out from the memory by means of the select means. The waveform number read out is converted into a corresponding waveform code by the converting means. The waveform code is used, for example, for wipe waveform generation.

An embodiment to follow is a wipe waveform selective generator incorporating this invention. FIG. 3 shows a block diagram of the embodiment. In the figure, keyboard 31 is an input device including numerical keys, for example. From keyboard 31, a waveform number is entered.

Figure 4:
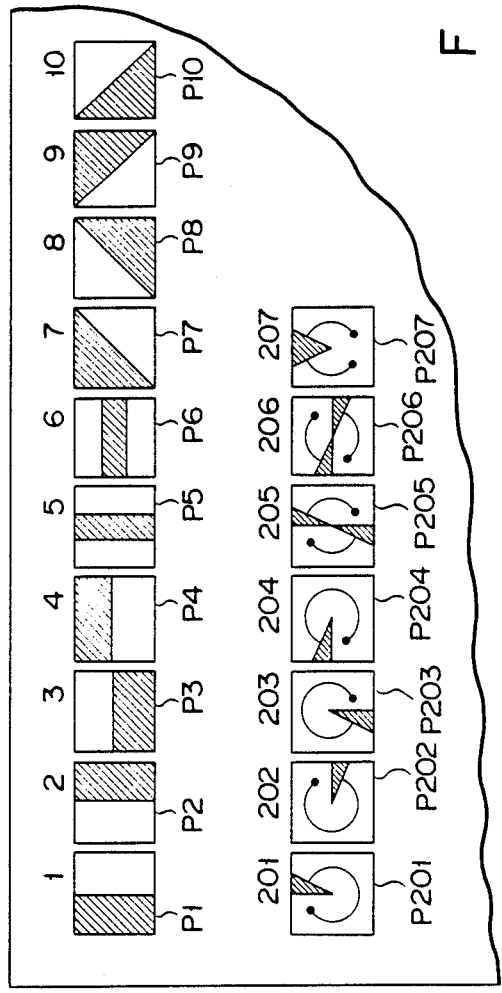
FIG. 4 shows a table used for entering a waveform number in the embodiment of FIG. 3.

In inputting a waveform number, reference is made to a table shown in FIG. 4, for example. In the table, a plurality of wipe waveform patterns P1 to P10, ... P201 to P207, which can be eventually depicted on a television screen, are respectively denoted by waveform numbers "1" to "10", ... "201" to "207". These wipe waveforms respectively have different predetermined forms. For example, to enter first wipe waveform pattern P1 at the initial stage of the entering operation, in which the left half of the screen is dark and the right half is bright, key "1" on keyboard 31 is depressed. To enter fifth wipe waveform pattern P5, in which the center of the screen is dark and the right and left portions are bright, key "5" on keyboard 31 is depressed. To enter a seventh wipe waveform pattern, in which the left half area of the screen diagonally separated between the upper right corner and the lower left corner is dark, and the right half area is bright, key "7" on keyboard 31 is depressed.

The waveform number data entered by keys "0" to "9" on keyboard 31 are transferred to key analyzer/key buffer 32. When key "#" on keyboard 31 is operated, the data of key analyzer/key buffer 32 is transferred to a plurality of waveform number storing memories 33-1, 33-2 and 33-3, to be described later.

The waveform number data are selectively stored into corresponding memory sections of memories 33-1, 33-2 and 33-3, and selectively read out under control of memory selector 34.

Memory selector 34 is connected to a plurality of memory select switches 39-1, 39-2 and 39-3. By a selective operation of memory select switch 39-1, 39-2 or 39-3, memory selector 34 selects a desired memory section of a plurality of memories 33-1, 33-2 and 33-3, when the waveform number is entered and when it is selectively read out.

When the waveform number is selectively read out, the waveform data stored in the memory section selected from a plurality of memories 33-1, 33-2 and 33-3 by memory selector 34 is transferred to waveform code converter 35 and figure pattern converter 36.

Figure 5:
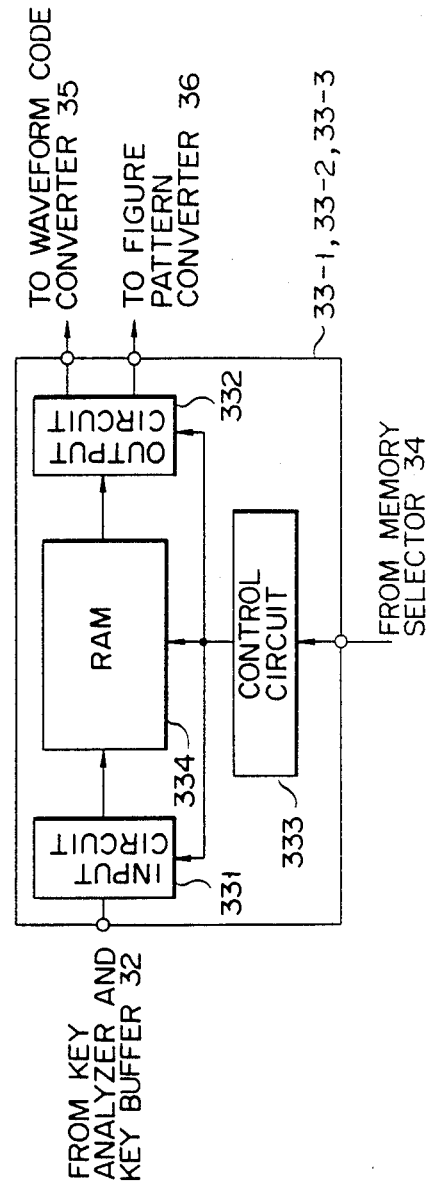
FIG. 5 shows a configuration of an internal circuit of each of the memories used in the embodiment.

The configuration of each of a plurality of memories (three memories are illustrated by way of example) is shown in FIG. 5. In the memory, the input and output of RAM 334 are respectively connected to input circuit 331 and output circuit 332. A control line is connected to input and output circuits 331 and 332, and control circuit 333.

Waveform code connector 35 converts waveform number data into corresponding waveform code 35a, and outputs code 35a to wipe waveform generator 38. Wipe waveform generator 38 generates wipe waveform signal 38a corresponding to waveform code 35a. Figure pattern converter 36 converts the waveform number data into corresponding figure pattern data 36a for displaying a waveform pattern, as shown in the table of FIG. 4, and outputs the figure pattern data 36a to display 37. In display 37, in response to a selective operation of memory select switch 39-1, 39-2 or 39-3, a waveform pattern and the corresponding waveform number such as "1", "5" or "7", are displayed, as shown in FIGS. 6A to 6C.

The operation of the embodiment thus arranged will now be described. First, waveform number data is entered. Data of waveform number as entered from keyboard 31 is transferred to key analyzer/key buffer 32. If the key analyzer decides that the data transferred to key analyzer/key buffer 32 represents any of "0" to "9", which designate waveform numbers, the key buffer temporarily stores the data. If the entered data is decided to be "#", in response to a selective operation of memory select switch 39-1, 39-2 or 39-3, the key buffer transfers the waveform number data stored in the key buffer to a waveform number storing memory as selected from memories 33-1, 33-2 and 33-3 by memory selector 34. The memory stores this data. Such an operation is repeated each time waveform number data are stored in any of memories 33-1, 33-2 and 33-3. In this embodiment, if three waveform number data are to be stored in respective of the memories, the operation is repeated three times, i.e., one time for each of the memories.

Next, to select an actual wipe waveform, selective readout is executed. The waveform number data stored in memory 33-1, 33-2 or 33-3 is selected by the operation of memory select switch 39-1, 39-2 or 39-3 via memory selector 34. In other words, in dependence on which of the memory select switches 39-1, 39-1 and 39-3 is operated, the waveform number data from the selected memory is transferred to waveform code converter 35 and figure pattern converter 36.

Waveform code converter 35 receives a waveform number data from the waveform number storing memory section selected by memory selector 34, converts the data into waveform code 35a and outputs code 35a to wipe waveform generator 38. For realizing waveform code converter 35 and wipe waveform generator 38, the technique disclosed in U.S. Pat. No. 4,086,619 can be used.

Figure pattern converter 36 receives the waveform number data in the waveform number storing memory section as selected by memory selector 34, and converts the waveform number data into corresponding figure pattern data 36a, and outputs the data to display 37. In display 37, waveform pattern P1, P5 or P7 and waveform numbers "1", "5" and "7" are displayed, as shown in FIGS. 6A, 6B and 6C, respectively.

With such an arrangement, by entering a waveform number from keyboard 31, a desired waveform can be selected from one thousand possible types, "0" to "999". The same number of selected waveforms as that of the memories can be entered.

As seen from the foregoing, the wipe waveform selective generator as mentioned above succeeds in overcoming the problems of the prior arts, i.e. the limit of waveform selection of the rotary switch technique, and the space factor and loss of cartridge problems involved in the cartridge technique.

While, in the above-mentioned embodiment, the number of waveform number storing memories used is three, five memories, for example, may be used if the memory select switch used requires such a number of memories.

All of the data stored in waveform number storing memories 33-1, 33-2 and 33-3 may be provided to Figure pattern converter 36. Display 37 may display a plurality of waveform patterns and all the waveform numbers correspondingly and concurrently, as shown in FIG. 7.

A plurality of wipe waveform generators may be used. For controlling these generators, the circuit configurations of FIG. 3 may be used, with the same number as that of the generators. For display 37, any suitable type of display device may be used, such as a CRT, an electroluminescent display, or a liquid crystal display, for example.

Key analyzer/key buffer 32, memory 33, memory selector 34, waveform code converter 35, and figure pattern converter 36 may be constructed using a microcomputer (CPU), and its peripheral circuit. This will be discussed referring to FIG. 8.

Figure 8:
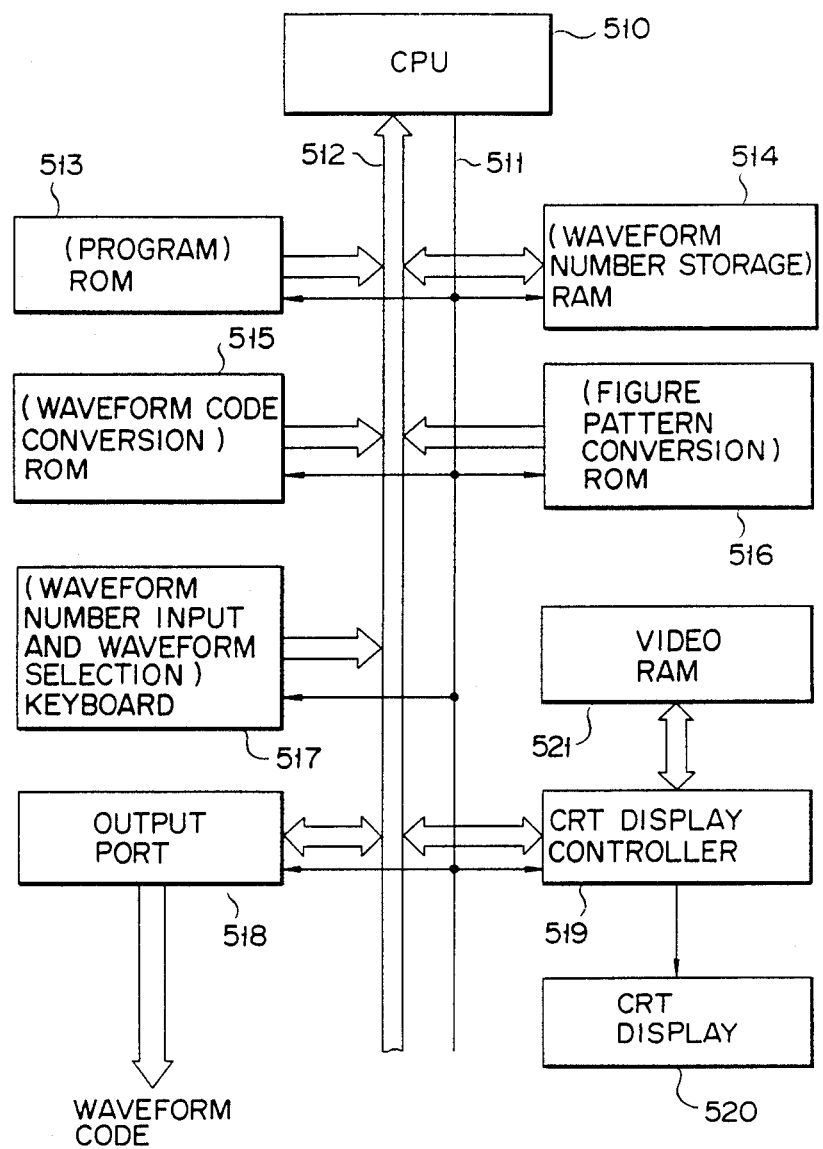
FIG. 8 is a block diagram showing another embodiment of a special waveform generating apparatus according to this invention, which uses a CPU and a peripheral circuit.

In FIG. 8, CPU 510, which executes the overall control necessary for entering and selecting the waveform number, is connected via control line 511 and data bus 512 to ROM 513 for storing a series of control programs, waveform number storing RAM 514, waveform code conversion ROM 515, figure pattern conversion ROM 516, waveform number enter/waveform selection keyboard 517, waveform code introducing output port 518, and CRT display controller 519. CRT display controller 519 is connected to CRT display 520 and video RAM 521. With such an arrangement also, the special effect (wipe) waveform selection can be done in the same procedure as that in the first embodiment.

As seen from the foregoing, the special effect waveform generating apparatus of this invention is free from the limited waveform selection which is inherent in the prior rotary switch technique, with its limited number of contacts of the rotary switch. Further, this apparatus is free from a loss of cartridge and a space factor problem, which are inevitably involved in the prior cartridge technique. Additionally, selection of a desired waveform is easy. Various waveforms can be generated selectively. Identification of a waveform to be selected is easy for the operator.

What is claimed is:

1. A special image effect producing apparatus comprising:
    input means for inputting waveform number data containing a number assigned to a special-effect waveform to be selectively generated;
    memory means connected to said input means in order to store said waveform number data, as input by said input means, into said memory means;
    memory select means for supplying memory select data to said memory means for reading out the waveform number data from said memory means;
    waveform code converting means for converting the waveform number data as read out from said memory means into waveform code, which corresponds to said special-effect waveform to be selectively generated; and
    special-effect waveform generating means for generating a special-effect waveform signal in response to the waveform code applied from said waveform code converting means, said generated special-effect waveform signal corresponding to said waveform code applied.

2. A special image effect producing apparatus according to claim 1, further comprising:
    figure pattern converting means for receiving said waveform number data read out from said memory means and for converting the read-out waveform number data into a figure pattern signal corresponding to a special-effect waveform to be generated, and
    display means for receiving a figure pattern signal from said figure pattern converting means and for displaying the figure pattern.

3. A special image effect producing apparatus according to claim 2, wherein said display means displays said figure pattern and its associated waveform number.

4. A special image effect producing apparatus according to claim 1, wherein said special-effect waveform is a wipe waveform.

5. A special image effect producing apparatus according to claim 1, wherein said input means includes numerical key for entering said waveform number data.

6. A special image effect producing apparatus according to claim 5, wherein said input means includes transfer means for transferring said waveform number data as entered by said numerical keys to said memory means.

7. A special image effect producing apparatus according to claim 6, wherein said transfer means includes a "#" key.

8. A special image effect producing apparatus according to claim 1, wherein said memory select means supplies to said memory means memory select data for storing said waveform number data.

9. A special image effect producing apparatus according to claim 1, wherein said memory means stores at least three pieces of waveform number data.

10. A special image effect producing apparatus according to claim 2, wherein said display means can simultaneously display all said figure patterns corresponding to said waveform number data stored in said memory means.

11. A special image effect producing apparatus according to claim 1, wherein said memory select means includes a switch means for designating said memory means.

12. A special image effect producing apparatus according to claim 11, wherein said memory select means includes a means for controlling said memory means, according to the designation from said switch means.

* * * * *